United States Patent [19]

Yver

[11] 4,093,081
[45] June 6, 1978

[54] TRANSFER ARM FOR TRANSFERRING SMALL OR MEDIUM SIZED PARTS

[75] Inventor: Jacques Yver, Grenoble, France

[73] Assignee: Metallurgie Francaise des Poudres-Metafram, Paris, France

[21] Appl. No.: 759,743

[22] Filed: Jan. 17, 1977

[30] Foreign Application Priority Data

Feb. 27, 1976 France .............................. 76 05588

[51] Int. Cl.² .............................................. B66C 1/54
[52] U.S. Cl. .............................. 214/1 BB; 214/1 BC; 214/DIG. 1; 294/97
[58] Field of Search .................. 214/1 B, 1 BB, 1 BC, 214/1 BD, 147 T, 151, DIG. 1; 294/67 C, 97

[56] References Cited

U.S. PATENT DOCUMENTS 3,722,711  3/1973  Seidel .............................. 294/97 X

FOREIGN PATENT DOCUMENTS 1,192,025  4/1959  France .............................. 294/97

Primary Examiner—Drayton E. Hoffman
Assistant Examiner—George F. Abraham
Attorney, Agent, or Firm—Haseltine, Lake & Waters

[57] ABSTRACT

A low inertia transfer arm for rapid operation and for manipulation of small or medium sized parts comprises a supporting arm adapted for connection at one end to a device for movement of said arm having at least two degrees of freedom, a pair of tongs comprising a pair of jaws for gripping a part and mounted at the other end of said supporting arm, one of said jaws being rigidly attached to said supporting arm and the other of said jaws being movable relative thereto between open and closed relative positions of said jaws, and means for controlling opening and closing of said jaws, said controlling means including a rocker lever comprising a pair of arms for movement between two stable positions by contact between a respective one of said arms and a fixed stop, a torsion bar extending along said support arm fixed at one end to said movable tong jaw and at the other end to said rocker lever for rotation therewith about its longitudinal axis to cause opening and closing of said jaws.

5 Claims, 4 Drawing Figures

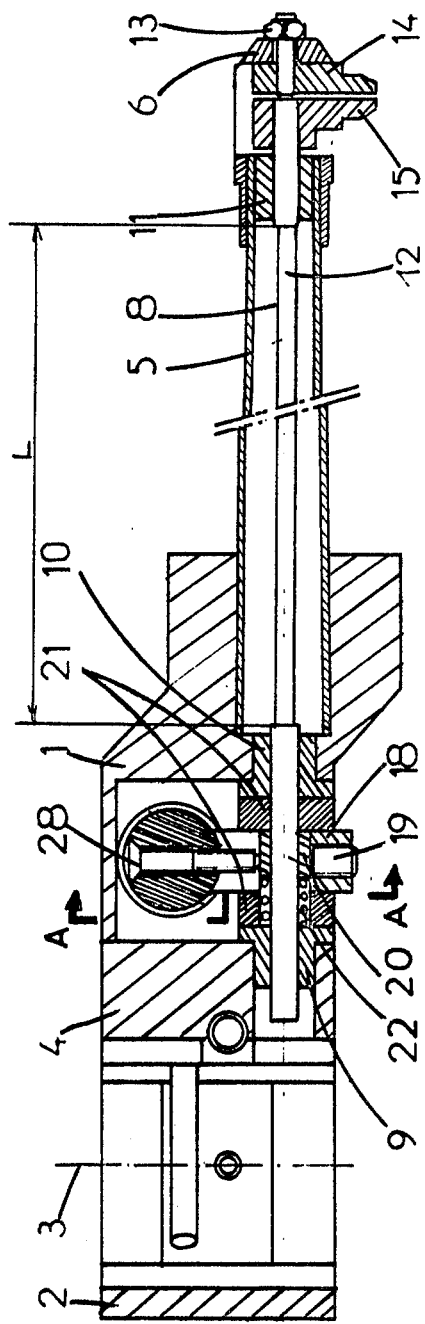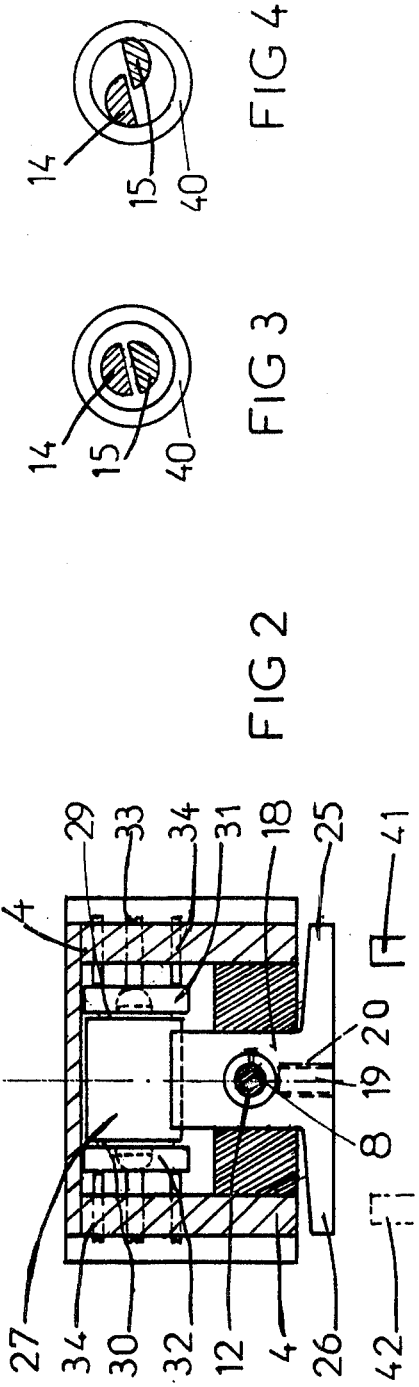

TRANSFER ARM FOR TRANSFERRING SMALL OR MEDIUM SIZED PARTS

The present invention concerns a transfer arm for transferring small or medium sized parts and which is to be employed for feeding machines such as presses and/or for discharge of the parts after machining.

Known transfer arms are usually endowed with a complicated motion having two degrees of freedom. This motion is generally composed of a horizontal toand-fro motion and two vertical motions each comprising a lowering and a raising of the arm when the arm has finished its horizontal motion in the forwards direction and in the return direction. The horizontal motion serves to transfer a part from an automatic feed motion to a machine tool or from this machine to a device for automatic discharge of the parts. The vertical motions serve to pick up and put down the part on the feed device and the machine or on the machine and the discharge device respectively. In order to seize or release the part, the transfer arms are equipped at one end with gripper devices which may be tongs, suckers or magnetic devices. These gripper devices must be tightened at the time of picking up the part and released at the time of putting this part down.

For a given machine, for example, a press the working cycle of which comprises raising a slide followed by lowering the slide into its starting position after passing through top dead centre, the motions of the transfer arm must be synchronized with the motions of the machine in order to effect transfer of the parts at the required moment, that is to say, in the case of the press, when the slide is near or at top dead centre. This synchronization is so difficult to achieve for rapid-operating machines that it is generally preferred to unclutch the press at the moment when the transfer is effected. This has the disadvantage of stopping the equipment which reduces its productivity and of requiring frequent operation of the press clutch the wear of which is high. Hence one tries to shorten the stopping time as much as possible or even to work continuously, with picking up and putting down of the parts being carried out during working of the machine in a synchronized manner. It will be understood that the time necessary for the actuation of the gripping device must be as short as possible and that its synchronization with the motions of movement of the transfer arm and of the slide of the press must be as close as possible since the final stage of the transfer process is conditioned by the other motions and the working cycle of the press which is desired to be as rapid as possible.

Because almost the whole of the transfer cycle must occur when the press slide is near or at top dead centre, the time during which this transfer motion can occur is obviously very short in the case of rapidoperating presses. During this short lapse of time the vertical lowering motion and the vertical raising motion of the transfer arm for putting the part down under the press tool must be carried out, as well as, at the end and/or a little before the end of the vertical lowering motion of the transfer arm, the motion of relaxing the gripping device to release the part to put it down.

It is the same for the gripping device associated with a transfer arm employed for discharge of parts after their machining, the motion of releasing the part being replaced by a gripping motion. In all cases the actuation of the gripping device must be effected during a small fraction of the time necessary for the motions of lowering and raising of the arm which must in turn be effected during a very short time. Actuation of the means for gripping the parts must therefore be effected in a very short time and in a manner perfectly synchronized with the other motions of the transfer arm.

Hitherto the systems employing tongs, which are the gripping devices which may be employed in the most general way, comprised two tongs jaws actuated by compressed air jacks connected by rather long piping to control valves, this remote transmission of the control as well as the inertia of the jaws and the jacks causing operating time delays the dissipation of which produces imperfect synchronization.

According to the invention there is provided a low inertia transfer arm for rapid operation and for manipulation of small or medium sized parts, said transfer arm comprising:

a supporting arm adapted for connection at one end to a device for movement of said arm having at least two degrees of freedom;

a pair of tongs comprising a pair of jaws for gripping a part;

means mounting said tongs at the other end of said supporting arm, one of said jaws being rigidly attached to said supporting arm and the other of said jaws being movable relative thereto between open and closed relative positions of said jaws; and means for controlling opening and closing of said jaws, said controlling means including:

a rocker lever comprising a pair of arms;

means mounting said rocker lever for movement between two stable positions, said rocker lever being arranged to be movable between said stable positions by contact between a respective one of said arms and a fixed stop;

a torsion bar extending along said support arm fixed at one end to said movable tong jaw and at the other end to said rocker lever for rotation therewith about its longitudinal axis to cause opening and closing of said jaws; and means mounting said torsion bar for rotation about its axis in said supporting arm.

The invention will be more fully understood from the following description of an embodiment of a transfer arm in accordance with the invention, and which is intended for feeding and/or for discharge of small fritted rings on a gauging-press, the embodiment being described by way of example only, with reference to the accompanying drawings.

In the drawings:

FIG. 1 is a longitudinal section through a transfer arm in accordance with the invention;

FIG. 2 is a transverse section along the line A—A of FIG. 1; and

FIGS. 3 and 4 show plan views of the jaws of the tongs of the arm of FIG. 1 at the moment of gripping a small fritted ring.

The transfer arm shown in FIG. 1 comprises a supporting arm 1 comprising at one of its ends a sleeve 2 intended for connection to a device for moving the arm in rotation about the axis 3 of the sleeve in one direction and the other and in translation in the direction of the axis 3 upwards and downwards. This device, which is not shown, may, for example, comprise an output shaft which can undergo a rotation in one direction and the other and a translation in the direction of its axis, this output shaft being fixed rigidly inside the sleeve 2. The supporting arm 1 also comprises a central portion 4 connected to the sleeve 2, a slightly frusto-conical tube 5 connected by one end to the central portion 4 of the arm 1, and an end ferrule 6 connected to the other end of the frusto-conical tube 5. The different parts of the supporting arm 1 are rigidly connected together. A cylindrical rod 8 extends inside the frusto-conical tube 5 over its whole length and is mounted for rotation by bushes 9 and 10 inside the central portion 4 of the supporting arm 1. At its other end the rod 8 is similarly mounted inside the tube 5 by a bush 11 before terminating at the end of the tube 5 at the level of the ferrule 6. The bushes 9, 10 and 11 ensure free rotation of the rod 8 about its longitudinal axis 12. A screw-and-nut assembly 13 enables rigid attachment of a jaw 14 of tongs to the ferrule 6. This jaw 14 constitutes the fixed jaw of the tongs the movable jaw 15 of which is rigidly connected to the end of the rod 8.

Reference will now be made to FIGS. 1 and 2. The end of the rod 8 opposite to that connected to the movable tong 15 is attached to a lever 18 by a screw 19 by way of a split clamping socket 20. The rod 8 may, depending upon each particular case, have different diameters in its portion lying between the bushes 10 and 11 in order to have the required torsional elasticity and in the other portions where it must have sufficient rigidity against bending.

A spring 22 working in opposition to the screw 13, which constitutes a stop against the end of the rod 8, determines the axial positioning of the rod 8 and the parts 18, 20 and 15 which are attached to it. The adjustment of the screw 13 at the time of locking its nut acts upon the clearance of the movable jaw 15 with respect to the fixed jaw 14. When the tongs are in the released position this clearance determines the initial play of the two jaws in the bore in a part 40 and consequently serves to adjust the accuracy of location in putting down the part. The four parts 21 are blocks of plastics foam preventing the introduction of dust into the mechanism, whilst enabling small angular movements in service or of translation in adjustment of the movable equipment constituted by the lever 18, the rod 8 and the spring 22.

The lever 18 comprises two arms 25 and 26 and a top portion 27 constituted by a magnet. The magnet 27 is of composite type including at each of its two end faces 29 and 30 at least one North pole and one South pole in order to enable closure of the magnetic flux circuit alternatively in one or other of armature plates 31 and 32 with the minimum of field leakage into the air. Closure of the lines of flux by one of the plates heavily attenuates the attraction exerted by the other plate. The magnet 27 is attached to the top portion of the body of the lever 18 by a screw 28 of a non-magnetic material in order to avoid a loss of flux.

The armature plates 31 and 32 are of ferromagnetic material. Each of them is fixed adjustably to the portion 4 of the arm by a device comprising a central tension-screw 33 the head of which is partially spherical to form a ball-and-socket joint, and 3 lateral compression screws 34 adjustable from the outer sideface of the arm 4. The adjustment of the screws 34 has the purpose of locking the plates 31 and 32 rigidly so as to be parallel with the polar faces 29 and 30, avoiding any oblique airgap, in order to have the maximum force of attraction between it and that one of the two plates which is bearing against it. There also results from this that, at the time of detachment of the magnet from the plate, no oblique parasitic movement of the plate is produced, so that the force of attraction decreases more quickly as a function of the increase in airgap.

The lever 18, the axis of rotation of which coincides with the longitudinal axis 12 of the rod 8, therefore has two stable positions.

One of these two positions which corresponds, for example, with contact between the face 29 and the part 31, corresponds with the position of the jaws of the tongs as represented in FIG. 3 corresponds with opening of these tongs. In this Figure the horizontal cross-sections of the jaws of the tongs are located facing one another and the points on the jaws of the tongs which are furthest apart are separated by a length equal to the diameter of the tongs. If the lever 18 is tilted by pressure against the lever arm 25 the face 30 of the magnet comes into contact with the ferromagnetic part 32 which represents the second stable position of the lever 18.

In order to come to this second stable position the lever 18 has turned through a small angle about the longitudinal axis 12 of the rod 8. The rod 8 which is attached rigidly to the lever 18 in turn rotates in the same direction as also does the jaw 15 of the tongs, which is attached to the end of the rod 8. The horizontal cross-sections of the two jaws of the tongs are now in the relative positions shown in FIG. 4 and the points on the jaws of the tongs which are furthest apart are now separated by a distance greater than the diameter of the tongs.

In FIGS. 3 and 4 is represented a small ring 40 of fritted metal inside which the tongs lie in a gripping position. The diameter of the tongs being less than the inside diameter of the ring fritted metal, it may be seen in FIG. 3 that at the start of the gripping motion the tongs penetrate into the bore in the ring. Release of the bi-stable lever 18 enables movement of the movable jaw 15 until the two jaws of the tongs are in contact with the inner surface of the ring, thus holding it clamped at the end of the transfer arm. The amplitude of the movement of the movable jaw is chosen so that it is greater than the movement which is just necessary for the two jaws of the tongs to come into contact with the inner surface of the parts to be manipulated. In the clamped position represented in FIG. 4 the jaw 15 is therefore held with a certain pressure against the inner surface of the ring 40 since the lever 18 has turned through an angle greater than the angle of rotation of the jaw 15, the difference between these two angles being absorbed by an elastic torsional deformation of the rod 8. The rod 8 therefore constitutes a torsion bar effecting tightening of the tongs by elastic deformation. The material constituting the rod 8 is chosen accordingly. In practice certain steels and titanium suit this usage perfectly.

As the amplitude of the elastic torsional deformation of the rod may vary over a relatively wide field it can be seen that the above described device enables gripping of parts the inside diameters of which may in turn vary about a mean value.

A transfer operation will now be described, effected by the above described arm of the present invention, which is employed for putting fritted rings down on a gauging press from a feed device for feeding rough parts.

At the start of the transfer cycle to be described, a part is lying at the outlet of the feed device and the transfer arm is in a position such that the gripping tongs are above this part. The tongs are in their position represented in FIG. 3. The device for movement of the arm then produces a rapid vertical lowering motion of the transfer arm which brings the tongs inside the bore of the ring 40. Towards the end of this motion the lever arm 25 comes into contact with a fixed stop 41 which causes abrupt tilting of the lever and movement of the jaw of the tongs 15 until clamping of the ring 40 is effected as shown in FIG. 4. At this moment the rod 8, playing the part of torsion bar, undergoes a slightly residual elastic deformation which enables clamping of the ring 40. The arm is then raised again rapidly up to its original position. It then undergoes a rotation about the axis 3 of the sleeve 2. At the end of this rotation the transfer arm is in a position such that the ring 40 is lying right above the position which it must occupy on the press during its machining. The arm then undergoes rapid vertical lowering at the end of which the arm of the lever 26 is pushed back by a fixed stop 42. This causes the return of the lever 18 into its starting position corresponding with the position of the jaws of the tongs shown in FIG. 3. This motion of the jaw 15 of the tongs frees the part 40 which is lying in position on top of the lower tool of the press and if necessary finishes putting itself in position by free fall of a few millimeters with sufficient accuracy. It should be observed that the part may be released at an instant more or less close to the end of the vertical lowering motion. The arm then undergoes a vertical motion upwards, followed by a rotation in the reverse direction to the previous rotation and of the same amplitude, which brings it back into its starting position. Of course in a continuous running machine, the motions of the transfer arm will be synchronized with the motions of the slide of the press, the above described transfer arm enabling synchronization between the tightening and untightening of the tongs and the vertical motions of the transfer arm. Transmission of the opening and closing order to the tongs being effected entirely mechanically, adjustments of it are facilitated. Adjustments of the airgap between the faces 29 and 30 of the magnet and the plates 31 and 32 respectively, which may be effected due to the balland-socket device of the screws 33 and 34, enable adjustment of the amplitude of the maximum rotation of the jaw 15 of the tongs. Similarly the instant when closing or opening of the tongs commences with respect to the end of the vertical motion of the transfer arm may easily be adjusted by movement of the fixed stops 41 and 42.

The invention is not intended to be restricted to the embodiment which has just been described, but on the contrary comprises any variants upon it. Thus it may be applied to the transfer of small or medium parts whatever their shape, as clamping may be effected by their internal profile as in the example which has just been described or by their external profile, the shapes and relative positions of the movable jaw and of one or a number of fixed jaws of the tongs being adapted to the shape of the part to be conveyed. For parts of a complicated shape it may be necessary in fact to employ a number of fixed jaws the attachment of which to the end of the supporting arm does not pose any particular problem. The transfer arm may be associated with any devices for movement whatsoever, which combine a horizontal rotary motion and vertical motions of translation as in the example which has just been described or horizontal motions of translation and vertical motions of translation or again motions of rotation or of translation in one direction and the other parallel with any plane whatsoever, each of these motions being followed by a motion of translation to and fro in a direction perpendicular to this plane or by more complicated motions. In particular this arm may be associated with a device which combines a rotary motion in one direction and the other in a vertical plane with translations to and fro at the end of each of these motions in a horizontal direction perpendicular to this plane, for the application of the above described transfer arm to the loading and unloading of a turning lathe having a horizontal spindle.

It is equally possible to associate two transfer arms as described above with one and the same device for movement, for example, a shaft which turns and slides, so that the arms are offset angularly on the shaft. Thus the two arms carry out simultaneously identical motions in different zones in space. Such a device may be applied to serving a production machine, one of the arms being used for loading and the other for unloading the machine. The bistable lever which has just been described employs the force created by a permanent magnet but it is possible to replace this permanent magnet by one or a number of electromagnets or to create this return force by one or a number of mechanical or pneumatic springs.

In all of the cases described above it is possible to have the end portions of the arms carrying the tongs very light but rigid because of the form of the tube 5 which is preferably tapered. The bistable mechanism is very compact and very close to the axis 3 of the sleeve. Thus one has the minimum moment of inertia of the masses and the maximum moment resisting the forces of bending, which are sometimes horizontal and sometimes vertical, at the end of the arm, which is favourable to very high speeds of operation and very small parasitic vibrations, and hence to very high accuracy.

Finally the above described transfer arm may be applied not only to the transfer of parts on gauging presses but also on any other types of machines or installations which process in repetition parts of small or medium dimensions in large numbers and more especially at high operating rates. These processes may include both the manufacture of the parts with or without removal of matter, or their thermal treatment, or surface coatings, or their automatic assembly on to other parts or their packaging or wrapping, for example.

What is claimed is:

1. A low inertia transfer arm for rapid operation and for manipulation of small or medium sized parts, said transfer arm comprising:
    a supporting arm adapted for connection at one end to a device for movement of said arm having at least two degrees of freedom;
    a pair of tongs comprising a pair of jaws for gripping a part;
    means mounting said tongs at the other end of said supporting arm, one of said jaws being rigidly attached to said supporting arm and the other of said jaws being movable relative thereto between open and closed relative positions of said jaws; and
    means for controlling opening and closing of said jaws, said controlling means including;
    a rocker lever comprising a pair of arms;
    means mounting said rocker lever for movement between two stable positions, said rocker lever being arranged to be movable between said stable positions by contact between a respective one of said arms and a fixed stop;
    a torsion bar extending along said support arm fixed at one end to said movable tong jaw and at the other end to said rocker lever for rotation therewith about its longitudinal axis to cause opening an closing of said jaws; and means mounting said torsion bar for rotation about its axis in said supporting arm.

2. A transfer arm as claimed in claim 1, wherein said rocker lever includes a permanent magnet having two opposite faces of attraction which are arranged opposite respective ferromagnetic members attached to said supporting arm, one of said faces of attraction being in contact with a respective one of said ferromagnetic members in each of said stable positions of said rocker lever.

3. A transfer arm as claimed in claim 2, including means for adjustment of the relative positions of said faces of attraction of said permanent magnet and said corresponding ferromagnetic members.

4. A transfer arm as claimed in claim 1, including at least one electromagnet for keeping said rocker lever in its two stable positions.

5. A transfer arm as claimed in claim 1, wherein the angle of rotation of said rocker lever is arranged to be greater than the maximum angle of rotation of said movable jaw at the time of seizure or release of a part.

* * * * *